Nov. 28, 1967  J. C. MORRIS  3,354,995
CLUTCH ARRANGEMENT
Filed March 7, 1966  2 Sheets-Sheet 1

INVENTOR
JOHN C. MORRIS
BY Frank A. Seeman
AGENT

Nov. 28, 1967  J. C. MORRIS  3,354,995
CLUTCH ARRANGEMENT
Filed March 7, 1966  2 Sheets-Sheet 2

INVENTOR
JOHN C. MORRIS
BY Frank A. Seeman
AGENT

United States Patent Office 3,354,995
Patented Nov. 28, 1967

3,354,995
CLUTCH ARRANGEMENT
John C. Morris, East Norwalk, Conn., assignor to Sperry Rand Corporation, New York, N.Y., a corporation of Delaware
Filed Mar. 7, 1966, Ser. No. 532,216
13 Claims. (Cl. 192—3.5)

The present invention relates to new and useful improvements in clutches and more particularly to a clutch arrangement of the type employing a spring clutch.

It is well known to provide a clutch arrangement in which a driven member is coupled to a driving member by utilizing a spring as the torque transmitting media. Usually a helical spring member is wound with a portion of its coils surrounding adjacent driving and driven elements. The spring member is adapted to frictionally engage the clutch elements by contracting thereon to provide a clutching function during clutch activation. In many present spring clutch arrangements of this type accuracy is a primary requisite. When the driving element of a spring clutch is rotated during a specific time interval the actual period of torque transmittal to the driven element depends on the various characteristics of the particular spring involved. Important among such characteristics is the spring wrap down time between initiation of driving element rotation, referred to as clutch activation, and actual motion of the driven member. If the wrap down time varies then consequently the period of torque transmittal varies, even though the period of clutch activation remains constant.

In arrangements where intermittent motion is imparted to a driven member disposed for interaction with other relatively moving parts, the problem becomes even more pronounced. When the initial motion of the driven member lags the initiation of motion imparted to the remaining moving parts, out of phase operation results. For example, the driven member may comprise an operative head, such as a print head, transversely scanning a moving web of paper or the like for intermittently marking same at accurately timed intervals. In such an arrangement, if the scanning head motion lags paper motion in a particular cycle, interaction between the head and the paper will be erratic, resulting in inaccurate output. When the scanning head is adapted to print information on the paper, the precise transverse position of the printout will vary in proportion to the variation in wrap down time. The amount of error increases with the speed of the particular mechanism involved. In modern high speed apparatus, which in many instances employ spring clutch arrangements, any degree of error is usually intolerable, depending of course upon the nature of the information involved.

In the past the general problem has been alleviated to some extent by providing spring clutches with accurately determined expansion and tension characteristics. However, even by controlling spring quality through selection of only those with radial expansion characteristics within close tolerance standards, the clutch wrap down time can be accurately predetermined only as long as the general spring characteristics remain constant. After a certain amount of wear during normal operation the radial expansion as well as the tension of the clutch spring are likely to vary, which gives rise to the problem for which subject invention presents a novel solution. Also contributing to the problem are the undamped vibrations of freely expanding spring coils as well as various other uncontrolled factors such as foreign particles which affect clutching friction.

It is an object of this invention to provide a novel clutch arrangement.

Another object is to provide a novel spring type clutch arrangement for accurately coupling a driven member to a driving member.

A further object is to provide a novel spring clutch arrangement adapted to provide reciprocating motion to a driven member wherein initial motion of the driven member occurs after an accurately controlled interval of time following clutch activation, regardless of variation in the expansion characteristics of the spring.

Yet another object is to provide a novel spring clutch arrangement for providing coupling between driving and driven members whereby clutch rotation is limited to less than one complete revolution, wherein the members are decoupled even if the driving member tends to activate the clutch beyond normal cut off.

Still another object is to provide a novel spring clutch in which the wrap down time of the spring coupling element is accurately maintained by establishing the initial relationship of the element with respect to other clutch members.

The present invention contemplates a novel clutch arrangement employing a spring type clutch for coupling a reciprocally driven member to a driving member. In one embodiment the spring member of the clutch is associated with appropriate stop means for biasing the spring to a predetermined level of tension when the clutch is deactivated to provide a predetermined location for the spring clutch coils relative to a driving hub, and ensure that clutch pickup will occur at an accurately determined time interval subsequent to initial activation. More specifically, reciprocation of the driven member is effected through coupling of the driving member in the positive direction and through coupling of a restore mechanism during reciprocal travel. During positive drive of the driven member a control device is utilized to selectively activate the clutch by urging the spring coils into position for frictional engagement. Prior to activation the spring is maintained closely adjacent the clutching surfaces at an accurately predetermined distance by a physical stop disposed in the path of the spring for preventing complete relaxation thereof. As a result of this arrangement in the rest condition of the clutch the spring is pretensioned to a bias position regardless of the previous cycle of operation.

The restore mechanism drives the driven member along a reciprocal path of travel after the positive excursion is completed. Means are associated with the clutch to sense the angle of rotation and in accordance with a selected angle disengage the control device. At this time the restore mechanism drives the driven member to its initial rest condition and counter-rotates the clutch elements to their non-activated position. The latter function serves to provide the spring retensioning essential to the novel operation of subject arrangement as set forth in further detail hereinafter.

One of several other features of subject invention consists of limiting means positioned in the path of the spring to prevent rotation of the driven hub past a predetermined angle of rotation in the event of a malfunction of the control device and spring disengagement does not occur at the normal time. The limiting means tends to expand the spring from its frictionally engaged condition and thereby deactivate the clutching arrangement notwithstanding restoration of the driven member.

The foregoing and other objects, features and advantages of the invention will appear more fully hereinafter from a consideration of the detailed description which follows, in conjunction with the accompanying drawings wherein one principal embodiment of the invention is illustrated by way of example. It is to be expressly understood however, that the drawings are for illustrative purposes only and are not to be construed as defining the limits of the invention.

In the drawings wherein like reference characters refer to like parts throughout the several views.

Figures 1, 2:
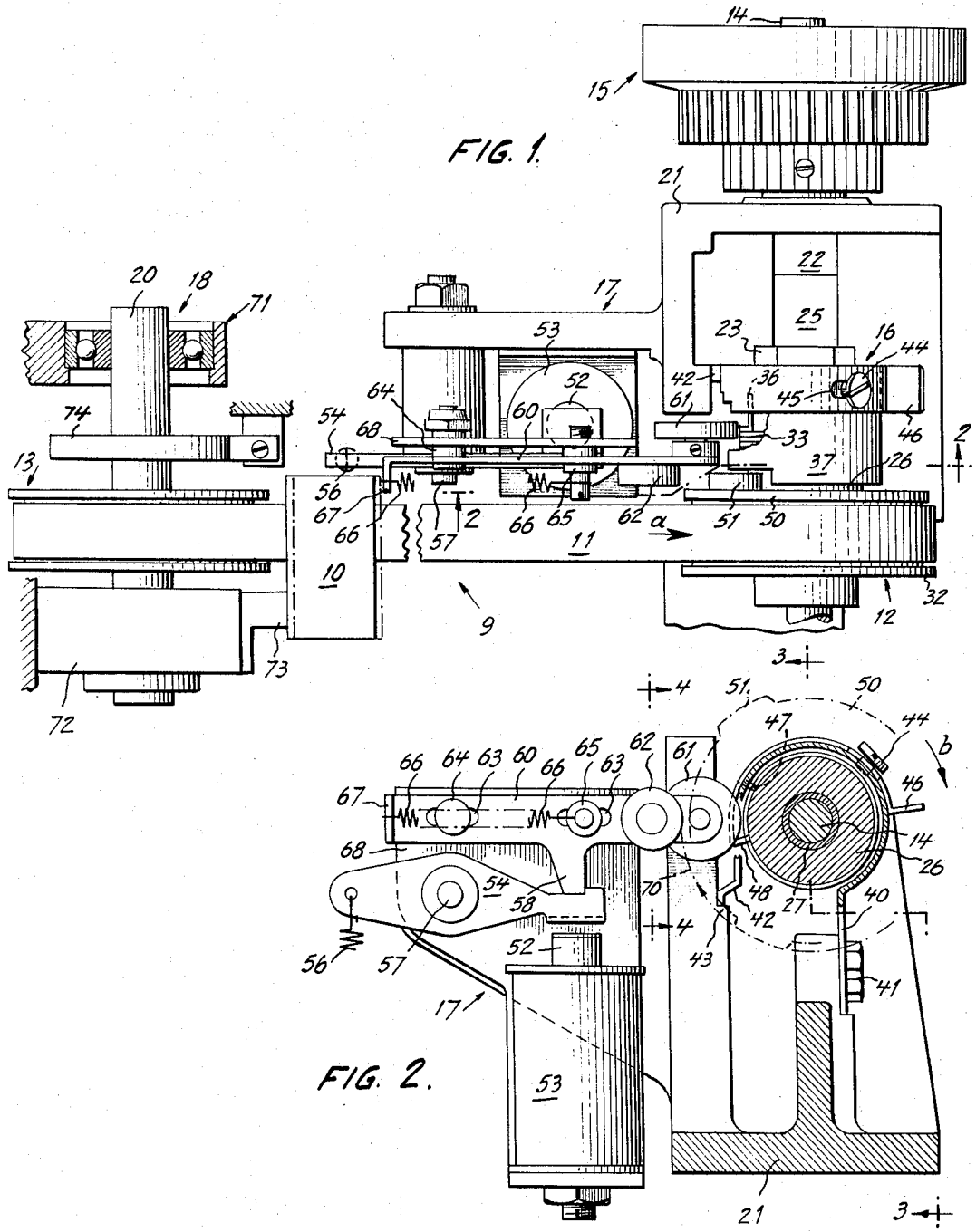
FIG. 1 is a plan view of a device which incorporated the novel clutch arrangement of the present invention.
FIG. 2 is sectional view taken along line 2—2 of FIG. 1.

Now referring to the drawings for a detailed description of the present invention, and more particularly to FIG. 1, a printing mechanism is generally designated by the reference numeral 9 and indicates by way of example apparatus incorporating an embodiment of the present invention. Mechanism 9 is adapted for reciprocally scanning an adjacent moving web of information receiving media (not shown) and includes a driven member 10 such as a print head for carrying print electrodes or the like, an endless belt 11 (partially shown in FIGS. 1, 3 and 4) upon which driven member 10 is mounted, and a pair of spaced pulleys 12 and 13 for operatively receiving belt 11. Pulley 12 is rotatably mounted on a shaft 14 and responds to motion imparted to a driving member 15 which is coupled to external drive means (not shown). As will hereinafter be described in further detail, during reciprocal drive of driven member 10 a spring clutch, generally designated by the reference numeral 16, is utilized to intermittently couple the torque of driving member 15 to pulley 12 resulting in positive travel of belt 11 and driven member 10 in the direction designated by arrow a in FIG. 1. Activation of clutch 16 is controlled by the operation of a control assembly 17 and the return excursion of driven member 10 and belt 13 is effected by a restore mechanism 18 associated with opposing pulley 13 mounted on a spaced shaft 20 for rotation therewith.

As mentioned above, a principal feature of the present invention is the means to couple a reciprocally driven member to a driving member. To this end, spring clutch 16, shown in detail in FIGS. 3, 4 and 5, includes shaft 14 rotatably mounted in support means such as a frame member 21 (FIGS. 1, 2 and 3), upon which the entire clutch arrangement is mounted. Shaft 14 is mounted for rotation in spaced bearing sleeves, only one of which is shown (FIGS. 1 and 3) and is indicated by reference numeral 22. Bearing 22 is arranged coaxial with shaft 14 adjacent driving member 15. Driving member 15 comprises a pulley and gear affixed to shaft 14 for transmitting torque to the shaft in a conventional manner from a drive source not shown, for unidirectional intermittent rotation at a predetermined speed. A cylindrically shaped driving hub 23 is secured to shaft 14 by set screw 24 and is spaced from bearing sleeve 22 by a bushing 25. A cylindrically shaped driven hub 26 is coaxially disposed for free rotation on shaft 14 by means of an anti-friction mounting sleeve 27. Driven hub 26 is disposed contiguous with driving hub 23 and possesses and outer diameter substantially equal to the outer diameter of the driving hub. Axial alignment along shaft 14 is maintained by a stop ring 28 secured to the shaft by a set screw 30.

Driven hub 26 is affixed to pulley 12, comprising a barrel element 31 and an end flange 32. The barrel element is adapted for substantially slip free coupling to belt 11, from which belt the output motion of the clutch is derived, i.e., the belt is driven in response to shaft rotation when the clutch is activated. A sprocket wheel and chain or any other similar combination, will serve equally well in the capacity of output take-off as long as the coupling exhibits substantially slip free characteristics.

The outer cylindrical surfaces of driving and driven hubs 23 and 26, respectively, present clutching surfaces for a spring 33 which helically encompasses portions thereof in the coaxial manner shown. Spring 33 is preferably made of rectangular wire stock wound tightly such that the adjacent coils (convolutions of the helical spring) are normally substantially engaged throughout the length of the spring, providing a radially expansible-contractable clutching sleeve. It should be noted that under rest conditions spring 33 is formed such that substantially all the coils encompassing the clutching surface of driven hub 26 are in snug engagement therewith. The spring end 34 (shown in FIG. 5) disposed adjacent hub 26 is turned radially inward for registration with an anchoring hole 35. The coils comprising the remaining portion of spring 33 are formed with a slightly greater diameter to provide nominal clearance between such remaining portion and the clutching surface of driving hub 23 under rest conditions. The endmost coil adjacent hub 23 is provided with an integral lug 36 (FIGS. 1, 4 and 5) projecting therefrom, and axially extending in spaced relationship from such hub at the same distance as the mentioned nominal clearance.

Figure 4:
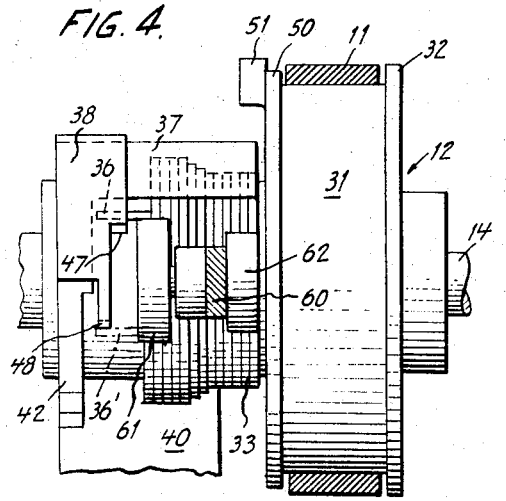
FIG. 4 is a sectional view taken along line 4—4 of FIG. 2.
Figure 3:
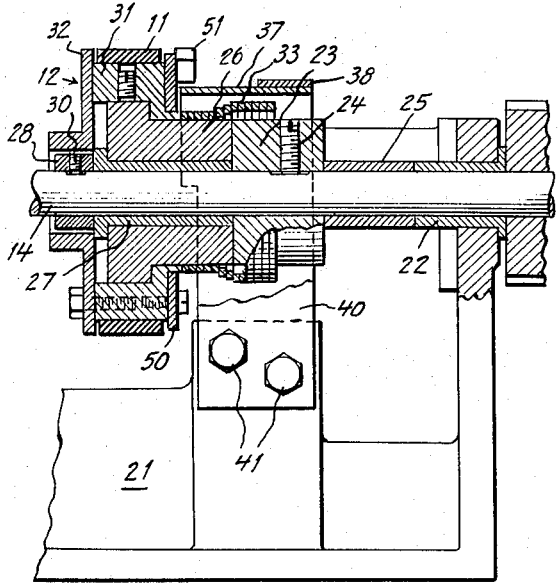
FIG. 3 is a sectional view taken along line 3—3 of FIG. 2.
Figure 5:
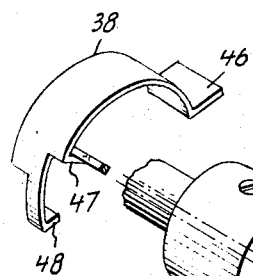
FIG. 5 is an exploded perspective view illustrating the parts of the novel clutch arrangement.
Figure 5:
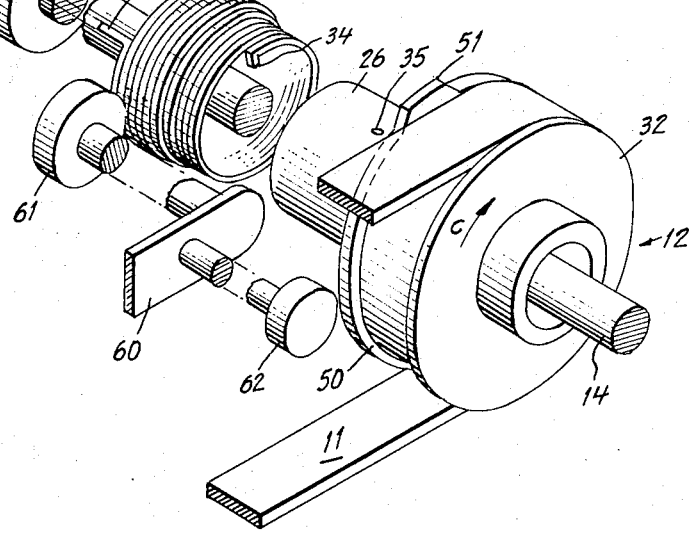

The spring and driving and driven hubs are arranged coaxially with a shield 37 and a spring engaging member 38 disposed in the general radial relationship shown at FIG. 3. Shield 37, which partially encompasses the spring (see FIGS. 2 and 4), includes a first end tab 40 secured to frame 21 by screws 41, and a second end tab 42 urged for resilient engagement on an integral shoulder portion 43 of the frame. The shield is rigidly constructed and secured in the position shown to provide adequate mounting means for spring engaging member 38. The last mentioned member is adjustably mounted on shield 37 by an adjusting screw 44 secured to the shield through an adjusting slot 45 (FIG. 1) in spring engaging member 38. A radially extending tab 46 extends outwardly from one end of member 38 to facilitate relative adjustment with respect to the shield when screw 44 is loosened. Spring engaging member 38 is also provided with an inwardly extending stop 47 which rests against driving hub 23 and is axially disposed to engage lug 36, as shown in FIG. 4. Spring engaging member 38 is further constructed to include inwardly extending limiting means 48 shaped in the same configuration as stop 47, which limiting means is disposed for engaging lug 36 when the lug is rotationally translated to the position shown in phantom outling 36' at FIG. 4.

A disc 50 is secured to barrel element 31 of pulley member 12. A cam member 51 is affixed to disc 50 and which cam is angularly positioned whereby the leading surface thereof circumferentially leads lug 36 when the clutch is activated for rotation in the direction illustrated by directional arrow b (FIG. 2).

Control assembly 17, mentioned above, is fully shown in FIGS. 1 and 2 and partially in FIG. 4. This assembly comprises a latching solenoid arrangement mounted on frame 21 adjacent clutch 16 (FIG. 1). An armature 52 is axially positioned within solenoid windings 53 for the purpose of imparting motion to a latch 54 in response to solenoid energization. Latch 54 is provided with an integral retaining shoulder 55 (FIG. 2). A spring 56 secured to frame 21, at a location not shown, tends to urge latch 54 in a counterclockwise direction about a pivotal mount 57. During the non-energized condition of the solenoid, latch 54 is urged in a manner whereby shoulder 55 provides a retaining force against a finger 58, now to be described.

Finger 58 is an integral projection extending from a roller mounting arm 60, adapted for mounting a spring engaging roller 61 and a cam engaging roller 62 on opposite sides thereof. The arm includes a pair of slots 63 through which the mounting studs 64 and 65 extend. A mounting arm spring 66 is disposed between stud 65 and extending flange 67 and is biased to urge mounting arm 60 toward the axis of shaft 14. Studs 64 and 65, are secured to a mounting bracket 68, which is an integral portion of frame 21. Roller mounting arm 60, by virtue of the described arrangement, is adapted for reciprocal motion confined by the limits of slots 63. Under conditions when the solenoid windings 53 are non-energized, roller mounting arm 60 rests in the position shown at FIGS. 1 and 2 with finger 58 against shoulder 55. Upon energization of the solenoid, latch 54 is pivoted clockwise about pivot 57 to release finger 58 from shoulder 55. Spring 66 will then tend to urge roller mounting arm 60 (and associated rollers 61 and 62) to the right toward shaft 14. In the rest position shown spring engaging roller 61 is positioned to remain spaced radially adjacent one or more (two has been found to be satisfactory) of the endmost coils of spring 33. The spacing is such that the roller will contact the coils prior to the time the mounting arm reaches the extent of its traversal limited by slots 63. Cam engaging roller 62 is spaced radially adjacent the path of cam member 51 for engagement therewith when the latter member is rotated to a position opposite roller 62. (See the path of cam travel illustrated by broken lines 70 in FIG. 2.) Such engagement urges roller mounting arm 60 away from shaft 14, whereby finger 58 is positioned to register with shoulder 55 of latch 54 when the solenoid is in the non-energized condition, which permits latch 54 to be rotated counterclockwise under the force of spring 56. If solenoid windings 53 are energized when cam member 51 engages roller 62, latch arm 54 will remain urged clockwise away from engagement with finger 58 and roller mounting arm 60 will return to the right toward shaft 14 when cam member 51 is not engaging roller 62.

The restore assembly 18, mentioned above, of the subject clutch arrangement comprises pulley 13 affixed to shaft 20 mounted for rotation in a bearing asembly 71 and a similar assembly (not shown) enclosed in a support member 72. Endless belt 11 extends between pulleys 12 and 13, and which pulleys are adapted for substantially slip free engagement between their associated barrels and the belt. The driven member 10, affixed to belt 11, reciprocates therewith in a manner set forth in the following operational description. The driven member 10 rests against a stop means 73 (secured to support member 72) disposed in the path of a projecting portion of the driven member. Driven member 10 is held in such rest position against stop means 73 by virtue of the action of a spiral spring 74 biased to rotate shaft 20, to which it is secured, in a direction tending to return driven member 10 to its rest position (FIG. 1).

In accordance with the above described arrangement operation for reciprocal drive of driven member 10 is effected in the following manner. Clutch 16 intermittently rotates pulley 12 in the direction of arrow c (FIG. 5) in response to an initiating signal introduced at the control assembly 17 for activating the clutch. Driven member 10 is driven via belt 11 from left to right (see directional arrow a FIG. 1). Upon deactivation, the clutch restore assembly 18 returns the driven member 10 to its rest position (solid outline FIG. 1) against stop means 73, and by so doing restores the overall clutch arrangement to its non-operative rest condition.

Normally, when the print mechanism is driven through one cycle of operation for the purpose of rapidly traversing the print head across the path of a moving web of paper (not shown), shaft 14 is rotated in the direction of arrow c (FIG. 5) by a drive source coupled to driving member 15. The time at which rotation commences is not critical as long as it is initiated prior to the following described operations. It should be first noted that driving hub 23 and stop ring 28 are mounted to rotate with the shaft while the other coaxial elements are mounted free thereon. Thus, hub 23 and ring 28 are the only coaxial elements in the clutch 16 that positively follow the drive source.

A print head excursion is commenced by providing energization for solenoid windings 53 to cause armature 52 to impart motion to latch 54, rotating it about pivotal mount 57 against the biasing force of spring 56. Finger 58 is then released from shoulder 55 of latch 54 to effect motion of roller mounting arm 60 carrying spring engaging roller 61 and cam engaging roller 62 toward the axis of shaft 14. When roller 61 engages the endmost coils of spring 33 the friction between the clutching surface of driving hub 23 and the spring 33 is sufficient to cause the spring to wind itself in a clockwise direction to effect coupling between the driving and driven hubs. As driven hub 26 rotates, pulley 12 rotated to drive the belt and print head in the direction of arrow a as long as the clutch rotates the driven hub. Simultaneously pulley 13 (FIG. 1) is rotated in the same direction as pulley 12, to cause spiral spring 74 to wind and thereby present counter torque along the axis of shaft 20. The counter rotational force is not sufficient to overcome the positive torque of the clutch.

The shaft 14 continues to rotate until cam member 51 engages roller 62 at which time the cam engaging roller is urged to the left (FIG. 1) causing the spring engaging roller to be disengaged from spring 33. Meanwhile solenoid windings 53 are deenergized and latch arm 54 returns under bias of spring 56 to its up position for engagement with finger 58 upon drive of roller mounting arm 60 to the left by cam 51 a distance illustrated by the phantom outline 70 of cam travel in FIG. 2, showing the position of cam 51 during engagement with the surface of cam engaging roller 62. When spring engaging roller 61 is released from engagement with spring 33, expansion of the spring decouples driving and driven hubs, 23 and 26, respectively. Driven hub 26 is then free to rotate in the opposite direction under the influence of spiral spring 74, transmitting force in a counter-rotating direction between the pulleys va belt 11. Thus, the print head, i.e., driven member 10, is returned along its linear path until it reaches stop means 73. Spring 33, which is affixed to driven hub 26, is also driven in a counterclockwise direction. However, prior to the time stop means 73 is reached (illustrated by phantom outline of member 10 in FIG. 1) lug 36 engages stop 47 on spring engaging member 38 to pretension spring 33 an amount sufficient to enable the wrap down of each succeeding cycle to be consistently accurate. Thus, the windings of spring 33 are adjustably set with lug 36 to assure that the nominal clearance between the driving hub and the spring remains constant.

Assume that in the course of the above operation spring engaging roller 61 fails to be removed from the spring when cam 51 reaches cam engaging roller 62 or if the roller is removed from the spring assume that spring expansion is delayed and decoupling is not properly effected. Under these conditions limiting means 48 provides means for engaging lug 36 to release the friction between the spring and the clutching surfaces. By referring to FIG. 2, it can be noted that limiting means 48 is so positioned with respect to cam surface 51 that the cam will necessarily be past the position at which the clutch deactivation is initiated by contact with cam engaging roller 62, when limiting means 48 engages lug 36. In the event that operation of this safety means is required, then the spring will slip on the driving hub until the problem is rectified, thus preventing serious damage to the clutch arrangement.

Many advantages of the present invention have been explicitly and implicitly set forth in the above description, e.g., the simple and economical construction of the clutch, and the widely diversified use to which the disclosed arrangement may be employed. It should be re-emphasized that the mechanism is extremely accurate and durable, and is therefore especially adaptable for high speed repetitive operation in printing apparatus. In prior art devices which are dependent on amount of coil relaxation (upon disengagement) for accuracy, relative size of the coils varies over an extended period of operation, resulting in a change in clearance and consequential variation in wrap down time. Subject invention obviates this by the novel lug and stop arrangement wherein variation of relative size of the coils does not affect operation of the clutch. The lug also serves a further function in its cooperation with the limiting means to provide a unique safety feature.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims as will now be understood by those skilled in the art.

What is claimed is:

1. A device of the class described comprising,
  (a) a driving element,
  (b) a driven element,
  (c) means for supporting said driving and driven elements for rotation,
  (d) a coiled spring member operatively connected to said driven element and adapted for rotation therewith,
  (e) a portion of said spring member encompassing a portion of said driving element and operable for movement into an engaged position and a disengaged position with respect to said driving element,
  (f) lug means on said spring member,
  (g) stop means carried by said support means for engaging said lug for biasing said spring at a predetermined level of tension under conditions when said spring portion is in the disengaged position, and
  (h) actuating means operable to urge said portion of said spring member into said engaged position for transmitting torque to the driven element to effect conjoint rotation of said driving and driven elements.

2. A device as set forth in claim 1 wherein limiting means are provided for engaging said lug means at a predetermined angle of rotation of said driven element to expand said spring member and thereby disengage said driving element.

3. A device as set forth in claim 1 wherein said support means include a rotatable shaft to which said driving element is coaxially affixed and on which said driven element is mounted for free rotation, and said actuating means include drive means for rotating said shaft in a direction tending to contract said spring member to effect coupling between said driving and driven elements under conditions when said spring portion is in the engaged position.

4. A device as set forth in claim 3 wherein said actuating means further include a roller adapted for engagement with said spring portion to urge said spring member against said driving element to initiate said coupling between said driving and driven elements by causing frictional engagement between the spring member and the driving element.

5. A device as set forth in claim 1 wherein output means are provided, said output means including a spaced shaft, an endless belt adapted to operatively couple said spaced shaft to said driven element for concurrent rotation therewith, and resilient means for counter-rotating said spaced shaft to exert a rotative force on said spaced shaft which is less than the rotative force exerted by said driving element to thereby impart motion to said belt in a first direction under conditions where said spring member and said driving element are in said engaged position and in a reciprocal direction under conditions where said spring member and said driving element are in said disengaged position.

6. A device as set forth in claim 5 wherein said endless belt extends along a linear path between said spaced shaft and said driven element, and said output means further include a driven member secured to said belt for reciprocation therewith along said linear path, and stop means disposed in the path of said driven member to effect a limit of travel of said belt in said reciprocal direction to thereby establish the angular position of said driven element under conditions where said spring and driving element are in said disengaged position.

7. A device as set forth in claim 5 wherein said actuating means include a first roller, operating means for urging said first roller against said spring member for effecting said engagement between said driving element and said spring member, cam means adapted for rotation with said driven element, and a cam engaging roller coupled to said operating means for motion therewith, said cam means positioned to engage said cam engaging roller for releasing said operating means from its urged condition to remove said first roller from said spring to thereby initiate the reciprocal travel of said belt at a predetermined angle of rotation of said driven element.

8. A device of the class described comprising,
  (a) support means,
  (b) a shaft rotatably mounted on said support means,
  (c) a driving hub secured coaxially to said shaft and having a cylindrical outer surface,
  (d) a driven hub rotatably mounted on said shaft in axial alignment with said driving hub and having a cylindrical outer surface with a diameter substantially equal to the coresponding diameter of said driving hub,
  (e) a helical spring member affixed to said driven hub and having a plurality of windings spatially encompassing and in coaxial relationship with a portion of said driving hub under conditions where the spring is relaxed and having a substantially like plurality of windings in snug engagement with and encompassing a portion of said driven hub,
  (f) an integral lugs extending from the free end of said spring adjacent said driving hub,
  (g) drive means for rotating said shaft in a direction opposite to the direction of the spring windings,
  (h) a roller disposed adjacent the spring windings encompassing said driving hub,
  (i) operating means for urging said roller against said spring to provide diametric contraction of said spring resulting from frictional engagement between the outer surface of the driving hub and the spring under said conditions where said shaft is rotated by said drive means,
  (j) means for releasing said operating means from said engaged condition prior to a complete revolution by said driven hub,
  (k) counter-rotating means coupled to said driven hub,
  (l) stop means mounted on said support means for engaging said lug when said spring is counter-rotated with the driven hub, and
  (m) mounting means for adjustably mounting said stop means in a position to prevent complete spring expansion and thereby bias said spring at a predetermined level of tension.

9. A device as set forth in claim 8 wherein said operating means comprise a solenoid, a latch operatively associated with said solenoid having first and second positions corresponding to deenergized and energized conditions of said solenoid, and roller mounting means for mounting said roller and adapted to urge said roller against the spring, said latch adapted in said first position to engage and hold said roller mounting means with said roller positioned a predetermined distance from said spring windings to release the frictional engagement between the driving hub and said spring member, said latch adapted in said second position to be disengaged from said roller mounting means, and wherein said drive means is adapted to rotate said shaft when said solenoid is in said energized condition to permit operative engagement between said spring and said driving hub.

10. A device as set forth in claim 8 and further including limiting means adjustably mounted on said support means for engaging said lug at a predetermined angle of rotation of said driven hub to expand said spring and thereby disengage said spring from frictional engagement with said driving hub under conditions where said means for releasing said operating means fails to operate prior to said predetermined angle of rotation.

11. A device as set forth in claim 8 wherein said counter-rotating means comprise a spaced shaft and an endless belt adapted to operatively couple said spaced shaft to said driven shaft for concurrent rotation therewith, and said counter-rotating means further comprising resilient means for rotatably urging said spaced shaft in a direction opposite to the direction of rotation effected by said driven means, said resilient means exerting a force which is less than the force exerted on said continuous belt by said driven shaft.

12. A device as set forth in claim 11 wherein said continuous belt extends along a linear path between said spaced shaft and said driven hub, and further including scanning means secured to said belt for reciprocation therewith along said linear path, and still further including second stop means disposed in the path of said scanning means to provide a limit of travel therefor under conditions where said spaced shaft is driven by said resilient means.

13. A device as set forth in claim 11 wherein said releasing means comprise a third hub disposed coaxially on said shaft and adapted for rotation with said driven hub and cam means affixed to said third hub for operatively removing said roller from said spring to initiate reciprocal motion of said scanning means at a predetermined angle of rotation of said shaft.

References Cited
UNITED STATES PATENTS

| | | | |
|---|---|---|---|
| 2,930,463 | 3/1960 | Dodge et al. | 192—81 |
| 2,954,108 | 9/1960 | Lenney | 192—81 |
| 3,298,486 | 1/1967 | Perryman | 192—41 X |
| 3,310,139 | 3/1967 | Buckley et al. | 192—81 X |

DONLEY J. STOCKING, *Primary Examiner.*

ARTHUR T. McKEON, *Examiner.*